United States Patent [19]

Worrell

[11] 4,192,657
[45] * Mar. 11, 1980

[54] METHOD AND APPARATUS FOR HALTING THE ADVANCEMENT OF ETHYLENE DECOMPOSITION FLAME FRONTS

[75] Inventor: G. Richard Worrell, Media, Pa.

[73] Assignee: Atlantic Richfield Company, Los Angeles, Calif.

[*] Notice: The portion of the term of this patent subsequent to May 31, 1996, has been disclaimed.

[21] Appl. No.: 921,546

[22] Filed: Jul. 3, 1978

[51] Int. Cl.² ........................ F17D 1/02; F17D 1/04
[52] U.S. Cl. .................................. 48/192; 137/334; 165/1; 165/81; 165/DIG. 14
[58] Field of Search .................. 48/190, 191, 192; 165/1, DIG. 11, 145, 174, 81; 138/44, 38, 118, 26; 137/334; 220/88 R; 206/0.6

[56] References Cited

U.S. PATENT DOCUMENTS

| 146,733 | 1/1874 | Wheelock | 165/81 |
|---|---|---|---|
| 1,735,261 | 11/1929 | Calhoun | 48/192 |
| 1,907,976 | 5/1933 | Jones | 48/192 |
| 2,087,170 | 7/1937 | Stephenson | 48/192 |
| 2,666,625 | 1/1954 | Byerley | 165/81 |
| 3,830,063 | 8/1974 | Morgan | 165/DIG. 14 |

Primary Examiner—S. Leon Bashore
Assistant Examiner—Peter F. Kratz
Attorney, Agent, or Firm—John R. Ewbank

[57] ABSTRACT

A flame arrestor is provided which can be connected with closely adjacent upstream and downstream portions of a pipeline. The gas flows through an array of narrow tubes immersed in the lower half of a normally liquid heat transfer fluid, thus normally maintaining the gas composition at ambient temperature. Even if a flame front enters either connector of the flame arrestor, the cooling effectively quenches the flame before the flame front can advance through the liquid-cooled narrow tubes to the other connector of the flame arrestor. The array of tubes is arranged as a return loop so that each tube can maintain structural integrity while expanding and contracting during rapid changes of temperature. Moreover, such return loop permits the connectors to be more readily attached to the upstream and downstream adjacent portions of the pipeline.

2 Claims, 3 Drawing Figures

METHOD AND APPARATUS FOR HALTING THE ADVANCEMENT OF ETHYLENE DECOMPOSITION FLAME FRONTS

RELATED INVENTIONS

Reference is made to the application of G. R. Worrell and F. F. McKay, Ser. No. 860,791, filed Dec. 15, 1977, entitled REACTION BOUNDARY SUPPRESSOR SYSTEMS, all the disclosure of which is incorporated herein and deemed here reiterated. Reference is also made to a concurrently filed application of G. R. Worrell, Ser. No. 921,636, filed July 3, 1978, entitled PIPELINE FLAME ARRESTOR, all the disclosure of which is incorporated herein and deemed here reiterated.

BACKGROUND OF INVENTION

1. Field of Invention

This invention relates to flame suppressors for gas pipelines.

2. Prior Art

A flame front of an undesired reaction may accidentally start to migrate through a pipeline system. The heat transfer conditions may be such that the flame will be quenches by the large amount of residual cooling of the combination of the environment and the pipeline. However, in other situations the pipeline may be relatively insulated. If the pipe diameter is large so that the total heat content of the flame front is great, then the pipeline may be heated to a temperature causing the rupture of the pipeline.

Inasmuch as ruptures of pipeline attributable to the advancement of a flame front are relatively rare, and inasmuch as the self-dissipation of a flame front can occur under a variety of conditions, there are a variety of engineering considerations tending to decrease the number of flame arrestors scheduled for installation merely to protect the long runs of a pipeline from rupture. However, the hazards inherent in permitting an advancing flame front to enter a gas processing facility, or a chemical plant, or a gas storage facility, are so serious that there is adequate economic justification for flame arrestors protecting substantially all facilities to which pipeline gas might be delivered, notwithstanding the infrequency of such accidents. If a flame front enters either end of a flame arrestor, the cooling effectively quenches the flame before the flame front can advance to the other end of the flame arrestor. Moreover, the flame arrestor is advantageously designed to quench two flame front separated in time by less than an hour or only a few seconds.

Preferred embodiments of the invention of said Ser. No. 860,791 feature a deep pool of heat transfer liquid, in the bottom half of which an array of heat transfer tubes serve to cool the divided gas stream flowing therethrough. Even if the one or more flame fronts involve significant heat, the cooling capacity of the liquid is sufficient to quench each flame front advancing into the reaction boundary suppressor system of said Ser. No. 860,791.

Initial plans contemplated the installation of a flame arrestor as a part of the length of gas line, as indicated in the drawings in said Ser. No. 860,791. Investigations relating to the cost of the construction of flame arrestors, adequacy of foundations, convenience of retrofitting modifications into established gas line systems, have established some disadvantages to the placement of a flame arrestor as an on-line insert into the length of the gas line.

SUMMARY OF THE INVENTION

In accordance with the present invention, a flame arrestor is provided which can be connected with closely adjacent upstream and downstream portions of a pipeline. The array of tubes is arranged as a return loop for easier attachment to the upstream and downstream adjacent portions of the pipeline. The thermal expansion and contraction problems, both for the pipeline and for the liquid-cooled tubes are significantly more manageable when the liquid-cooled tubes form a return loop instead of straight through.

If desired a flame arrestor may include both the feature of said return loop and a feature of liquid cooled surfaces at the area transition zones as described in said concurrently filed application for a PIPELINE FLAME ARRESTOR.

DESCRIPTION OF DRAWINGS

In the accompanying drawings.

The nature of the invention can be further clarified by reference to some illustrative embodiments and by some description of some of the perimeters affecting the invention.

ILLUSTRATIVE EMBODIMENTS

Figure 1:
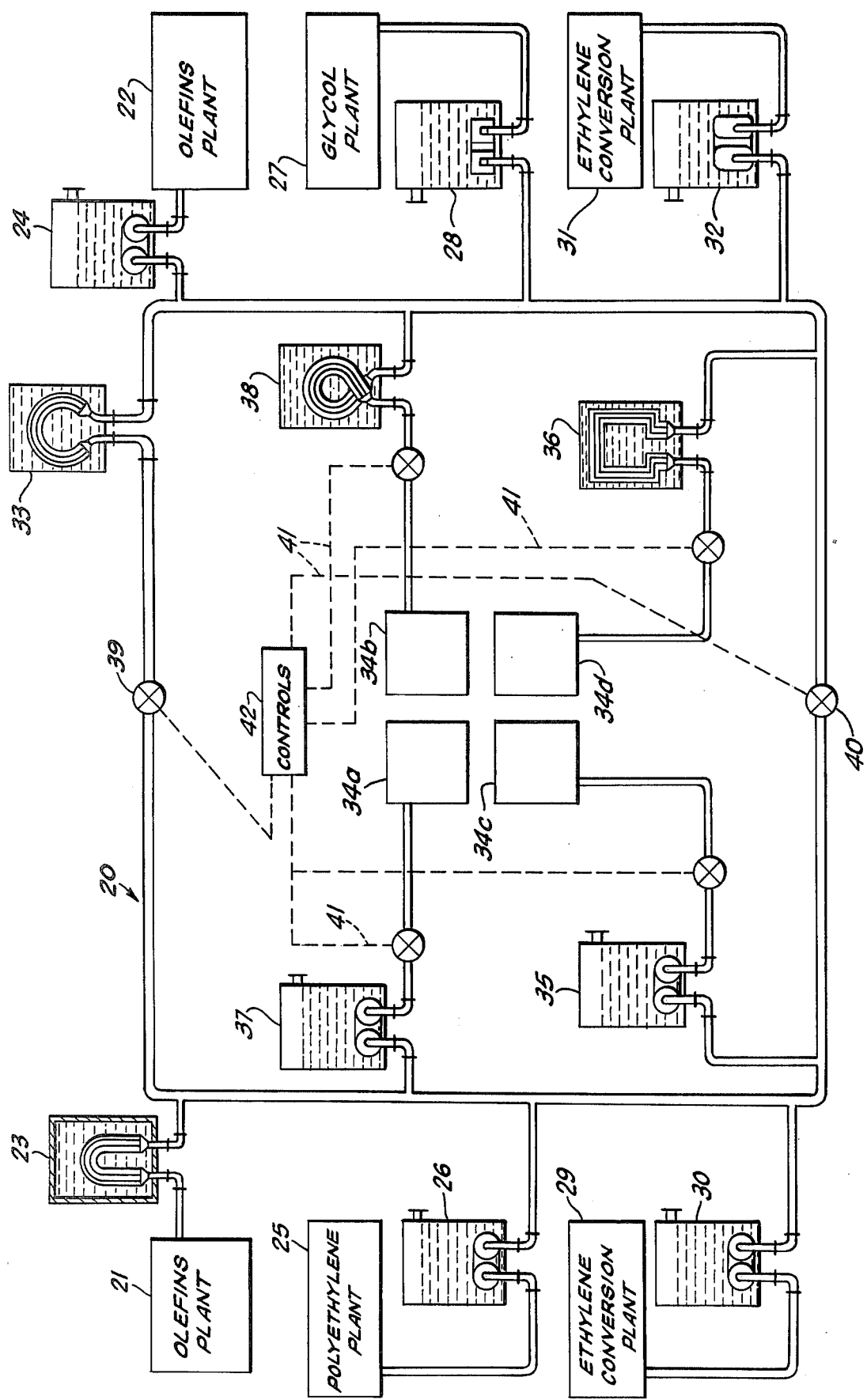
FIG. 1 is a schematic drawing of a pipeline system having a flame arrestor protecting each of a plurality of facilities to which the gas is delivered.

As shown in FIG. 1 a gas pipeline system 20 comprises a return loop accommodating a plurality of customers comprising a polyethylene plant 25, glycol plant 27, and a plurality of other plants 29 and 31. The pipeline system is also associated with four stand-by storage systems 34a, 34b, 34c, and 34d. Communication lines 41 provide sensing signals and actuating signals to controls 42 intended to actuate valves such as valves 39, 40, and to improve the functioning of storage system 34. The pipeline system 20 is supplied with ethylene from two olefins plants 21 and 22.

Pipeline systems of the general complexity previously described have functioned for many years without flame suppressors. In the development of the present invention, it was discovered that the hazards justify the installation of flame suppressors for the protection of the pipeline, as indicated at 33 and for the storage systems 34a, 34b, 34c, 34d by flame suppressors 37, 38, 35, and 36 respectively. Moreover, the hazards merit the protection of olefins plants 21, 22, polyethylene plant 25, glycol plant 27, and ethylene conversion plants 29 and 31 with flame suppressors 23, 24, 26, 28, 30, and 32 respectively. FIG. 1 thus exemplifies appropriate locations for flame suppressors in a pipeline system 20.

A steel pipe can be heated to a point of sufficient softening that the pipe ruptures when a flame front advances very slowly through such pipe. In the event that conditions permit the flame front to advance more slowly and/or stabilize at a particular location while the supply of gas continues flowing to such flame front, the heating of the metal tube can be quite intense and quite rapid.

Many advantages arise from maintaining an array of heat exchange tubes as a cylindrical bundle, inasmuch as the fabrication procedures for the leak-proof connection of heat transfer tubes to a cylindrical tube sheet are well established. As a flame front is moving through a flame suppressor, the heat transfer tubes adjacent the entry zone can be heated very rapidly to an elevated temperature, leading to the formation of bubbles of vapor adjacent each of the tubes immersed in the heat transfer liquid. The flow of upwardly-moving steam (if the heat transfer liquid is predominantly water) can be so rapid that some of the upper tubes immediately adjacent the entry zone are almost instantly surrounded by the hot steam generated at the lower tubes. Thus, certain upper tubes may not have liquid cooling near the entry zone. Using the straight through design shown in the drawings of said Ser. No. 860,791, it is plausible that the heat expansion of an upper tube would lead to the expansion and distortion from original straight-line shape to a bowed shape as a result of such rapid expansion and contraction of the tubes initially experiencing the flame front. Surprisingly, such distortion of an upper tube has been observed in tests conducted with a straight-through type of flame suppressor. Inasmuch as a flame suppressor must be absolutely reliable, and inasmuch as some presently-unforseeable accident might impose a heat load even greater than employed in the test, a superior approach for coping with the unobvious thermal expansion/contraction difficulties was invented.

Figure 2:
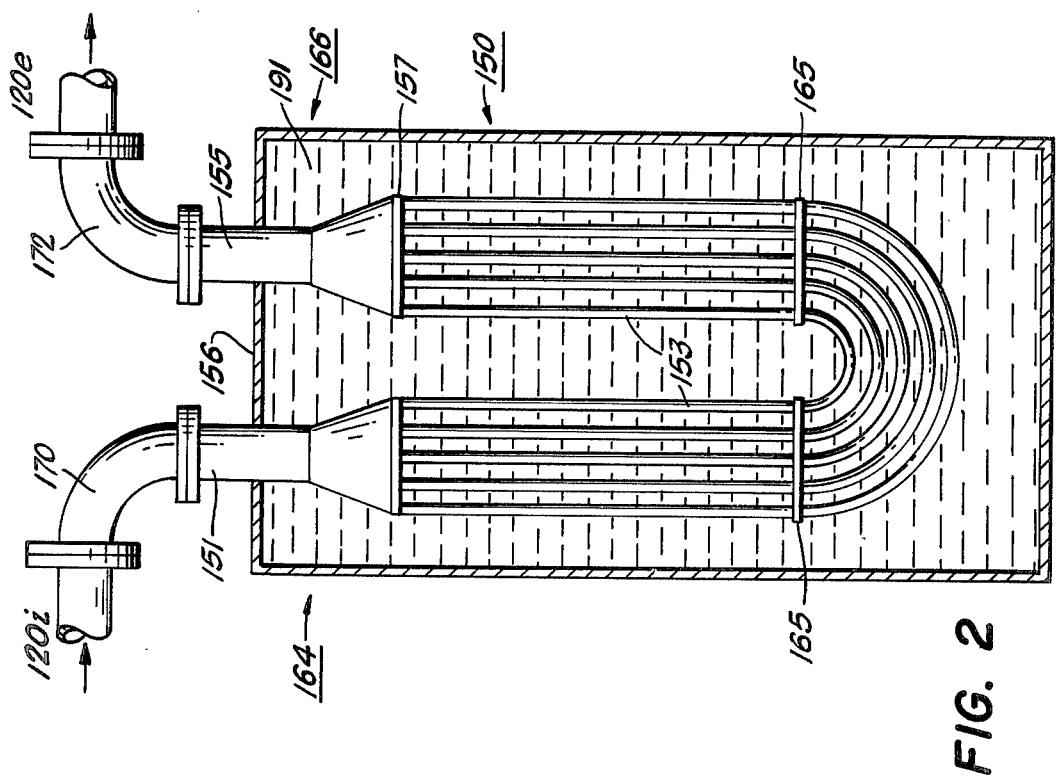
FIG. 2 is a schematic cross-sectional top view of an array of tubes arranged as a "U" immersed in the bottom half of the liquid in the vat of a flame arrestor.

As shown in FIG. 2, a flame suppressor 150 having a return loop is shown as a schematic top view. A bundle of heat transfer tubes 153 is shaped as a "U" so that each of cylindrical tube sheets 156, 157 can be rigidly positioned. Each tube 153 can make appropriate adjustments of expansion or contraction by sliding relative to each support 165 so that the curved portion of the U-shaped tube bundle lacks the absolute anchoring of the tube sheets 156, 157. If a plurality of flame fronts enters the flame suppressor 150 of FIG. 2, the heat transfer tubes 153 may have portions which become hot and expand, but such thermal expansion of the portions of the tubes 153 does not jeopardize the structural integrity of the flame arrestor 150.

An inlet portion of a pipeline system 120, designated as 120i, can be directed through an elbow 170 to an inlet connector 151, which extends through wall 156 into the submerged portion of the flame arrestor 150. Similarly, an exit portion 120e of pipeline system 120 is connected by an elbow 172 to an exit connector 155, which is directed through the wall 156 to the submerged portion of the flame suppressor. The bundle of the array of tubes has a generally circular cross section; hence, entry means 164 has a generally conical shape, as does exit means 166. Because FIG. 2 is a top view, it does not explain that the array of tubes is submerged approximately in the lower half of the heat transfer liquid pool 191.

Figure 3:
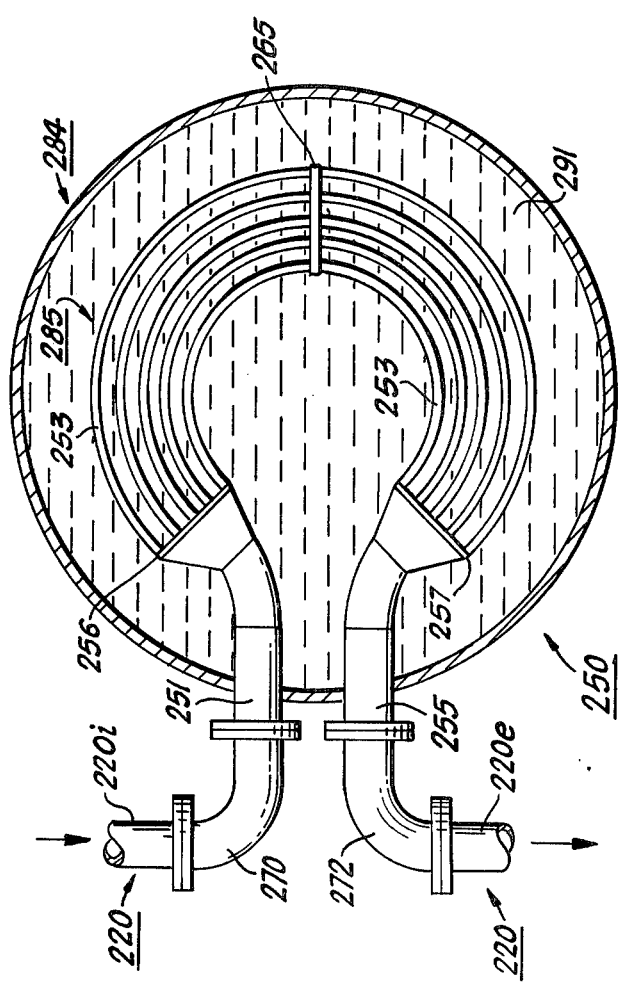
FIG. 3 is a schematic view of one of the many alternative approaches toward a return loop adapted to accommodate to the expansion and contraction of rapid temperature changes while also simplifying the connection of a flame arrestor to a previously installed pipeline.

As shown in FIG. 3, tubes 253 are assembled as an array 285 having a generally circular cross section. Thus at each of circular tube sheets 256 and 257, each tube 253 can be welded to its tube sheet with an assurance of maintaining structural integrity. To the extent that a tube 253 is heated sufficiently to stimulate expansion thereof, such thermal expansion does not jeopardize the structural integrity of the connection between the end of the tube 253 and its tube sheet. One or more supports 265 accommodates the thermal expansion of each of the heat transfer tubes 253. An inlet portion 220i of pipeline system 220 is connected to inlet pipe 251 through elbow 270. Similarly, exist pipes 255 is connected to a downstream portion 220e of pipeline system 220 through an elbow 272. The flame suppressor 250 of FIG. 3 comprises a wall 284 defining the vat in which there is the pool 291 of heat transfer liquid, the tube array 285 being immersed in what is normally the lower half of such heat transfer liquid.

FIG. 3 is merely illustrative of one of the many variations of a return loop.

To the extent that the present invention is treated as a process, it can be thought of as a method of halting the advancement of flame fronts within a control zone in a system for the pipeline flow of a gaseous composition, there being a hazard of accidental advancement of one or more flame fronts, which method consists of: controlling the path of the compressed gaseous composition so that, at appropriate control zones of contemplated flow of said gaseous composition, said gaseous composition is divided into a plurality of narrow tubular streams having cross-sectional dimensions of not more that 4 centimeters and having a length greater than a meter, said streams following a path which is a return loop connecting with adjacent portions of said pipeline system, and cooling the plurality of narrow tubular gas streams by transferring heat from the gas streams to a liquid normally maintained below about 150° C., whereby the gaseous composition immediately adjacent any advancing flame front and flowing throughout the entire length of said narrow tubular stream is cooled and quenched to a temperature below the self-sustaining reaction temperature at such conditions.

To the extent that the present invention is concerned with apparatus it can be thought of as apparatus for halting the advancement of flame fronts which consists of: an array of narrow tubes having a length of at least 1 meter and an internal diameter of not greater than about 4 centimeters through which said compressed gaseous composition is adapted to flow, each tube following a path which is a return loop adapted to maintain structural integrity during expansion and contraction attributable to rapid changes of temperature; a shell defining a vat, said vat containing a pool of liquid normally maintained at about ambient temperature, the upper surface of the pool of liquid being exposed to the surroundings in such manner that vapor may evaporate from the upper surface of the liquid, said array of tubes being immersed in the lower half of the depth of said pool of liquid; entry means directing gas flowing from a downstream portion of a gas pipeline through an entry pipe into the entry zone of said return loop; and exit means directing gas flowing through said plurality of tubes, through an exit zone of said return loop toward an exit pipe associatable with an upstream portion of said gas pipeline, said exit pipe being closely adjacent the entry pipe, and said upstream portion of the pipeline being closely adjacent said downstream portion of said pipeline system.

The present invention, whether as a system or apparatus, has particular applicability for controlling the migration of the reaction boundary of the decomposition reaction of compressed ethylene.

It has been known that a decomposition reaction could advance throughout a great length of a pipe containing compressed ethylene. The temperature of the spontaneously advancing decomposition reaction is hot enough to cause blistering of paint on the external surface of a pipe in which compressed ethylene decomposes to a mixture comprising soot, carbon, minor amounts of hydrogen, minor amounts of miscellaneous hydrocarbon, and a molar amount of methane approximately equal to the initial ethylene. The speed of the flame is quite low, eliminating the detonation hazard but permitting explosions of vessels unable to withstand the pressures built up by the decomposition reaction. The build-up of pressure is attributable primarily to the increased temperature of the gas mixture, instead of the conventional volume increasing reaction. Because piping for compressed ethylene is built with an adequate safety feature, it is conceivable that the decomposition reaction boundary might move through a pipe for a very considerable distance without any explosion and even without any rupture of the pipe.

The amount of cooling necessary for quenching an accidental reaction if affected by many factors, including flame speed, exothermicity of the reaction, magnitude of gas compression, pipe diameter, single or multiple flames, and related factors. Heretofore most flame arrestors have had a cooling capacity which is only a small fraction of the cooling capacity necessary to quench the forward and trailing reaction boundaries for the decomposition of ethylene at 100 atmospheres in a pipeline of about 30 cm diameter. Because accidents sometimes involve hazards which had not been predicted, there has been a long standing demand for flame arrestors having an adequate safety margin as regards cooling capacity sufficient to quench a reaction .

In a pipe in which compressed ethylene is flowing and in which a localized surge of heat initiates decomposition reaction boundaries, such boundaries can initially move in two opposite directions or in as many directions as the piping system permits. In the typical single pipe in which the decomposition reaction boundaries start moving initially in two opposite directions and in which the ethylene is flowing in one of those two directions, the pipe is heated by each of the two reaction boundaries advancing in the same direction as the flowing ethylene. Whether the boundaries are identified as leading and trailing boundries or as head and tail boundaries, the second arriving boundary is more difficultly quenched because of the residual heat from the first arriving boundary.

The speed of each reaction boundary is only a small fraction of the normal speed of the flow of the ethylene. The temperature of a particular zone of the pipe is increased because of the passage of each of the two flame fronts through such zone, usually within minutes of each other. Moreover, the methane gas and suspended soot in the methane zone between the two reaction boundaries is hot enough to warm the pipe but undergoes cooling. The total heat capacity of a plug-zone of decomposition products (conveniently called a methane zone) and the two reaction boundaries is far greater than the heat capacities of advancing segments of hot gases for which some flame arrestors have been designed. Some flame arrestors have been designed for flame speeds much higher than the remarkably slow speed of advancement of the ethylene cracking reaction boundary, which is sometimes a few (i.e. from 3 to 20) cm per minute and rarely if ever faster than 4000 cm per minute. It is the combination of the potentially low speed of advancement of the reaction boundary and the remarkably large heat capacity of the elongated methane zone which imposes unique restraints upon quenching the ethylene decomposition reaction.

Various modifications are possible without departing from the scope of the claims.

The invention claimed is:

1. The method of halting the advancement of ethylene decomposition flame fronts within a control zone in a system for the pipeline flow of ethylene along a relatively great distance, there being a hazard of accidental advancement of one or more flame fronts, which method consists of:

controlling the path of the compressed ethylene so that, at appropriate control zones of contemplated flow of said ethylene, the ethylene instead of flowing through a conventional portion of an ethylene pipeline is directed through an array of narrow tubes having cross-sectional dimensions of not more than 4 centimeters and having a length greater than a meter, said tubes following a path which is a return loop connecting with adjacent portions of said pipeline system, and cooling the ethylene in said plurality of narrow tubes by transferring heat from the ethylene streams to a liquid normally maintained below about 150° C., said liquid having an upper surface so exposed that vapor may evaporate from such upper surface, said tubes normally being immersed significantly below said upper surface of said liquid, whereby the compressed ethylene flowing throughout the entire length of said narrow tubes is cooled and quenched to a temperature below the decomposition temperature of ethylene at such conditions.

2. In a system for the pipeline flow of compressed ethylene along relatively great distances, there being a hazard of accidental advancement of one or more ethylene decomposition flame fronts which can advance through the pipeline system from a point of origin, the apparatus for halting the advancement of flame fronts which consists of:

an array of narrow tubes having a length of at least 1 meter and an internal diameter of not greater than about 4 centimeters through which said compressed ethylene flows each tube following a path which is a return loop maintaining structural integrity during expansion and contraction attributable to rapid changes of temperature;

a shell defining a vat, said vat containing a pool of liquid normally maintained at about ambient temperature, the upper surface of the pool of liquid being exposed to the surroundings in such manner that vapor may evaporate from the upper surface of the liquid, said array of tubes being immersed significantly below the surface of said pool of liquid;

entry means connected to the ethylene pipeline system directing ethylene flowing from an upstream portion of an ethylene pipeline through an entry pipe into the entry zone of said return loop; and exit means connected to the ethylene pipeline system directing ethylene flowing through said plurality of tubes, through an exit zone of said return loop toward a downstream portion of said ethylene pipeline, said exit pipe being closely adjacent the entry pipe, and said upstream portion of the pipeline being closely adjacent said downstream portion of said pipeline system.

* * * * *